(12) United States Patent
Kastiel

(10) Patent No.: US 12,428,141 B2
(45) Date of Patent: Sep. 30, 2025

(54) FIXED WING ROTORCRAFT

(71) Applicant: EFIX AVIATION LTD, Kadima (IL)

(72) Inventor: Efraim Kastiel, Tel Aviv (IL)

(73) Assignee: EFIX AVIATION LTD, Kadima Tzoran (IL)

( * ) Notice: Subject to any disclaimer, the term of this patent is extended or adjusted under 35 U.S.C. 154(b) by 0 days.

(21) Appl. No.: 18/679,702

(22) Filed: May 31, 2024

(65) Prior Publication Data

US 2024/0400199 A1    Dec. 5, 2024

(30) Foreign Application Priority Data

Jun. 1, 2023   (IL) ........................................... 303403

(51) Int. Cl.
*B64C 27/52* (2006.01)
*B64C 27/26* (2006.01)
*B64C 27/72* (2006.01)

(52) U.S. Cl.
CPC .............. *B64C 27/26* (2013.01); *B64C 27/52* (2013.01); *B64C 27/72* (2013.01)

(58) Field of Classification Search
CPC .......... B64C 27/26; B64C 27/52; B64C 27/72
See application file for complete search history.

(56) References Cited

U.S. PATENT DOCUMENTS

| | | |
|---|---|---|
| 3,905,565 A | 9/1975 | Kolwey |
| 7,871,044 B2 | 1/2011 | Hursig et al. |
| 9,058,743 B2 | 6/2015 | Bourret et al. |
| 9,169,012 B2 * | 10/2015 | Corrigan ................. B64C 27/32 |
| 9,540,100 B2 | 1/2017 | Dekel et al. |
| 9,592,908 B2 | 3/2017 | Gentry |
| 9,914,535 B2 | 3/2018 | Paulos |
| 10,046,853 B2 | 8/2018 | Vander Mey |
| 10,109,208 B2 | 10/2018 | Cherepinsky et al. |
| 10,131,426 B2 | 11/2018 | Judas et al. |
| 10,322,796 B2 | 6/2019 | Lee |
| 10,829,200 B2 | 11/2020 | Gonzalez et al. |
| 10,974,826 B2 | 4/2021 | Karem et al. |
| 11,111,010 B2 | 9/2021 | Bernard |
| 11,148,799 B2 | 10/2021 | Robertson et al. |
| 11,926,443 B2 | 3/2024 | Kastiel |
| 2004/0232280 A1 * | 11/2004 | Carter ..................... B64C 27/52 |
| | | 244/17.25 |
| 2005/0045762 A1 * | 3/2005 | Pham ..................... B64C 27/26 |
| | | 244/7 R |
| 2016/0059958 A1 | 3/2016 | Kvitnevskiy |
| 2016/0137298 A1 | 5/2016 | Youngblood |
| 2016/0214710 A1 | 7/2016 | Brody et al. |
| 2016/0311528 A1 | 10/2016 | Nemovi et al. |
| 2019/0135424 A1 | 5/2019 | Baity et al. |
| 2019/0351999 A1 | 11/2019 | Stamps et al. |

(Continued)

FOREIGN PATENT DOCUMENTS

| | | |
|---|---|---|
| CN | 107757912 A | 3/2018 |
| CN | 110386248 A | 10/2019 |

(Continued)

*Primary Examiner* — Tye William Abell
(74) *Attorney, Agent, or Firm* — Panitch Schwarze Belisario & Nadel LLP

(57) ABSTRACT

Fixed wing rotorcraft capable of a flight trajectory from a vertical takeoff via straight and level forward flight at high airspeed to vertical landing without compromising controllability.

12 Claims, 7 Drawing Sheets

(56) References Cited

U.S. PATENT DOCUMENTS

| | | |
|---|---|---|
| 2020/0023829 A1 | 1/2020 | Hefner et al. |
| 2020/0070969 A1* | 3/2020 | Campbell .............. B64U 50/23 |
| 2022/0043465 A1 | 2/2022 | Vander Mey et al. |
| 2022/0204157 A1 | 6/2022 | Vander Mey et al. |
| 2023/0202651 A1 | 6/2023 | Christensen et al. |
| 2023/0303271 A1 | 9/2023 | Kastiel |
| 2023/0348088 A1 | 11/2023 | Besse et al. |
| 2024/0002078 A1* | 1/2024 | Kastiel ................... B64C 27/52 |

FOREIGN PATENT DOCUMENTS

| | | |
|---|---|---|
| CN | 110435887 A | 11/2019 |
| EP | 1995174 A2 | 11/2008 |
| EP | 2897863 A1 | 7/2015 |
| EP | 2990332 A1 | 3/2016 |
| KR | 20200110850 A | 9/2020 |
| WO | 2016149545 A1 | 9/2016 |
| WO | 2020191489 A1 | 10/2020 |

* cited by examiner

Takeoff/ Hover

Low Airspeed

Medium Airspeed

High Airspeed

Medium Airspeed

Low Airspeed

Takeoff/ Hover

FIXED WING ROTORCRAFT

CROSS-REFERENCE TO RELATED APPLICATIONS

This application claims priority under 35 U.S.C. § 119(b) to Israel Application No. 303403, filed Jun. 1, 2023, the disclosure of which is incorporated herein by reference.

FIELD OF THE INVENTION

The invention relates to fixed wing rotorcraft.

BACKGROUND OF THE INVENTION

Rotorcraft include one or more rotor systems each having a mast configured to have two or more rotor blades attached thereto. Some rotorcraft are intended for autorotation assisted straight and level forward flight wherein their rotor disc(s) are rotated by airflow passing therethrough.

Gyroplanes or autogyros have one or more free spinning rotor systems and rely on an independent powered forward propulsion unit for straight and level forward flight. In a gyroplane or an autogyro, its one or more rotor systems are tilted backwards as its independent powered forward propulsion unit drives it forward.

Gyrodynes combine a helicopter design and an autogyro design and accordingly each rotor system is driven by a rotor drive system for enabling vertical takeoff, hovering and vertical landing. Gyrodynes also have fixed wings which provide lift during forward flight.

Fixed wing rotorcraft that rely on autorotation for straight and level forward flight are known to have a bounded airspeed to maintain controllability.

There is a need for fixed wing rotorcraft intended for autorotation assisted straight and level forward flight at faster airspeeds than the bounded airspeed which was previously considered a maximum airspeed without compromising controllability.

SUMMARY OF THE INVENTION

The present invention is for fixed wing rotorcraft capable of a flight trajectory from a vertical takeoff via straight and level forward flight at high airspeed to vertical landing without compromising controllability. The present invention is based on the following understandings: Fixed wing upward lift exponentially increases with airspeed. Straight and level forward flight requires upward lift. Controllability requires a minimal rotor disc rotational speed that in turn requires a certain rotor disc Angle of Attack (AOA) relative to airflow. And autorotation can equally take place and enable full controllability at both positive and negative rotor disc Angle of Attack (AOA) relative to airflow.

Fixed wing rotorcraft of the present invention include a fuselage, at least one pair of fixed wings for providing upward lift, a forward propulsion unit for providing forward thrust, and a rotor system(s) having a mast with at least two rotor blades to present a rotor disc. The rotor system includes a conventional rotor system arrangement for controllable collective rotor blade pitch and controllable cyclic rotor blade pitch. The mast is tiltable with respect to the fuselage such that when the fuselage is substantially horizontal for straight and level forward flight, its rotor disc presents a correspondingly variable Angle of Attack (AOA) relative to airflow between a positive AOA and a negative AOA. The mast can be tiltable by way of cyclic control as described in co-pending Applicant's U.S. patent application Ser. No. 18/035,463 published under US Patent Application Publication No. US 2024/0002078 A1, the contents of which are incorporated herein by reference. Alternatively, a mast can be tilted by a mechanical arrangement.

Fixed wing rotorcraft of the present invention further include a real-time Flight Control System (FCS) for controlling the rotor system(s) and the forward propulsion unit in response to a desired input maneuver and sensor signals to operate the rotorcraft for takeoff, forward flight at various airspeeds and landing. The presently disclosed subject matter, or certain aspects or portions thereof, may take the form of program code embodied in computer readable storage medium for loading into a computing device whereupon the computing device becomes the FCS.

Fixed wing rotorcraft of the present invention have two modes of autorotation assisted straight and level forward flight: A first airspeed mode in which its one or more rotor discs autorotate at a positive rotor disc Angle of Attack (AOA) relative to airflow and its/their rotor blades are set at a first collective rotor blade pitch. The first airspeed mode is comparable to a conventional gyrodyne cruise speed, namely, the above mentioned bounded airspeed which was previously considered a maximum airspeed. And a second airspeed mode for faster airspeeds than in the first airspeed mode and in which its one or more rotor discs autorotate at a negative rotor disc Angle of Attack (AOA) relative to airflow and its/their rotor blades are set at a second collective rotor blade pitch different from the first collective rotor blade pitch to maintain a rotor disc's spin direction. In the second airspeed mode, rotor disc rotation at the negative rotor disc AOA generates downward lift to counteract increased upward lift generated by the fixed wings compared to the first airspeed mode due to the increased airspeed.

Transition between a rotor disc's positive Angle of Attack (AOA) relative to airflow and its negative Angle of Attack (AOA) relative to airflow and vice versa may reduce its rotational speed and hence lead to a temporary reduction in controllability. Such temporary reduction of controllability can be readily managed by one or more flight control procedures: The second collective rotor blade pitch is configured to maintain substantially the same rotational speed during a transition. A rotor system can partially powered to maintain rotational speed and hence controllability during a transition. By utilizing a rotor system's rotational inertia and completing a transition swiftly, a transition will only have minor effect on rotational speed, thereby maintaining sufficient controllability during same.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF DRAWINGS

Figure 1:
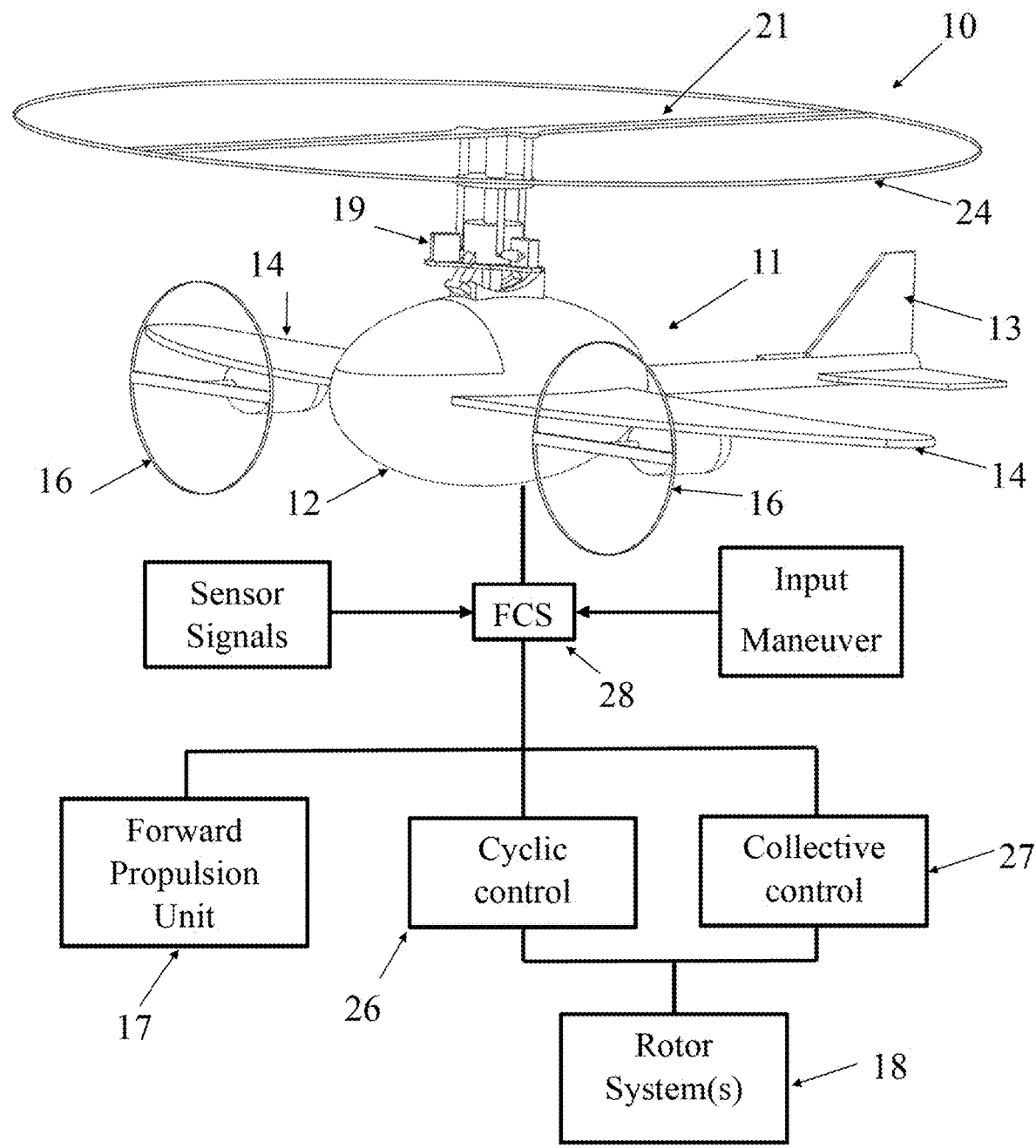
FIG. 1 is a combined pictorial view and block diagram of a single rotor fixed wing rotorcraft designed for straight and level forward flight at high airspeed.

FIG. 1 shows a single rotor fixed wing rotorcraft 10 intended for a flight trajectory from a vertical takeoff via straight and level forward flight at high airspeed to vertical landing without comprising controllability. The fixed wing rotorcraft 10 includes a fuselage 11 having a main fuselage 12 and a tail 13. The fixed wing rotorcraft 10 includes a pair of fixed wings 14 mounted on the fuselage 11. The wings 14 each have a propellor 16 such that the fixed wing rotorcraft 10 includes a forward propulsion unit 17 for providing forward thrust. Alternatively, the forward propulsion unit 17 can be constituted by a single rear mounted pusher, a puller, and the like.

The fixed wing rotorcraft 10 includes a rotor system 18 having a mast 19 having two rotor blades 21 and a rotor drive unit 22 (not shown) coupled to the mast 19 through a gear transmission 23 (not shown) for driving the mast 19 whereupon its rotor blades 21 act as a rotating rotor disc 24. The rotor drive unit 22 can be an electric motor, a fuel motor, and the like.

The fixed wing rotorcraft 10 includes a conventional collective control 26 for controlling the collective rotor blade pitch of the rotor system 18 and a conventional cyclic control 27 for controlling the cyclic rotor blade pitch of the rotor system 18. Conventional collective control and conventional cyclic control include a swashplate mechanism. An alternative collective control and cyclic control include a hollow mast, a stationary swashplate mechanism mounted at a fixed position along the hollow mast, a stationary servo arrangement for actuating the swashplate mechanism for cyclic control of its rotor blades only, and a stationary dedicated collective control servo for collective control of its rotor blades through the hollow mast. Yet another alternative rotor system arrangement is disclosed in U.S. Pat. No. 2,994,386 to Enstrom entitled Control Mechanism, the contents of which are incorporated herein by reference.

The mast 19 is tiltable backward and forward with respect to the fuselage 11 in the direction of forward flight such that the rotor disc 24 presents a correspondingly variable Angle of Attack (AOA) with respect to airflow. The mast 19 is preferably tilted forward and backward by cyclic control as described in above-mentioned U.S. patent application Ser. No. 18/035,463, the contents of which are incorporated herein by reference. Such cyclic control also affords orthogonal tilting to backward and forward tilting with respect to a fuselage. Alternatively, the mast 19 can tilted backward and forward with respect to a fuselage in the direction of forward flights by a mechanical arrangement.

The rotor system 18 preferably includes a freewheel arrangement. Depending on a rotor system's implementation, the freewheel arrangement can be implemented as a mechanical freewheel mechanism or a non-mechanical freewheel mechanism.

The fixed wing rotorcraft 10 includes a Flight Control System (FCS) 28 for controlling the forward propulsion unit 17, the rotor system 18, the collective control 26 and the cyclic control 27 in response to a desired input maneuver and a multitude of sensor signals regarding the attitude of the fixed wing rotorcraft 10, flight conditions, and the like. The FCS 28 is a computing device including at least one processing unit and memory.

Figure 2A:
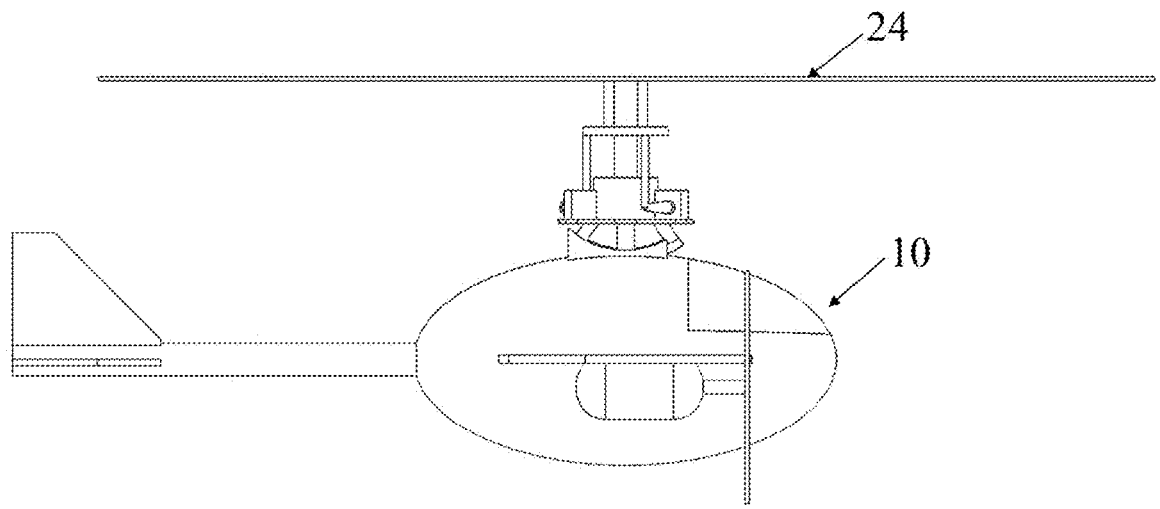
FIG. 2A is a side elevation view of the FIG. 1 fixed wing rotorcraft with zero rotor disc Angle of Attack (AOA) relative to airflow suitable for vertical takeoff, vertical landing and hovering.
Figure 2B:
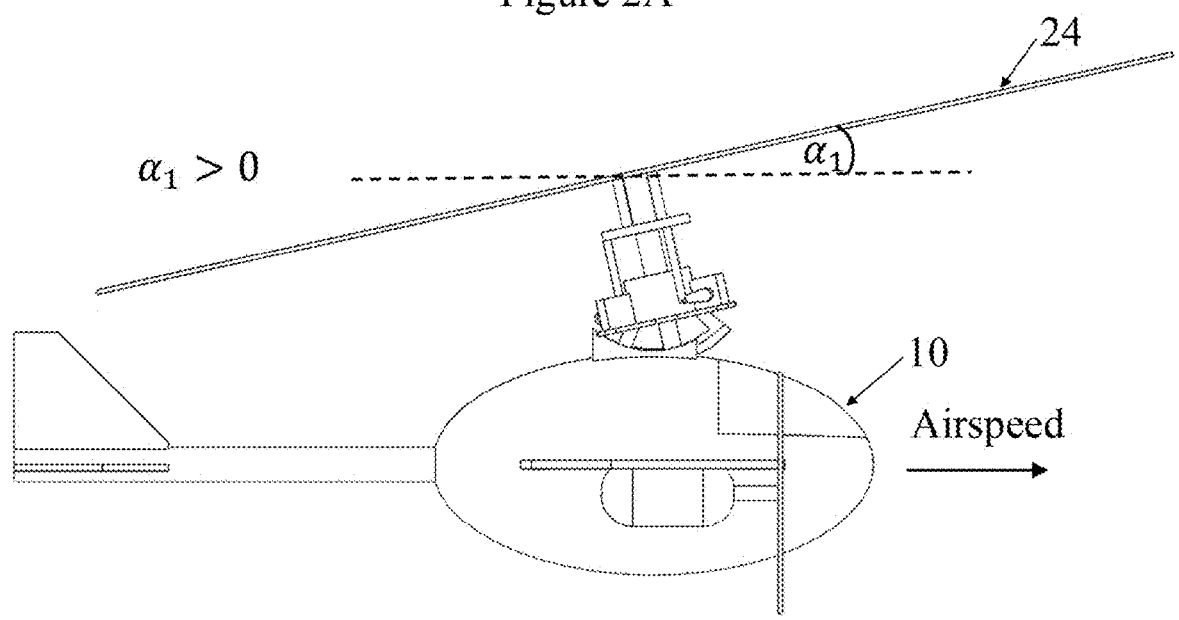
FIG. 2B is a side elevation view of the FIG. 1 fixed wing rotorcraft with a high positive rotor disc Angle of Attack (AOA) relative to airflow suitable for straight and level forward flight at low airspeed on operation of its forward propulsion unit.
Figure 2C:
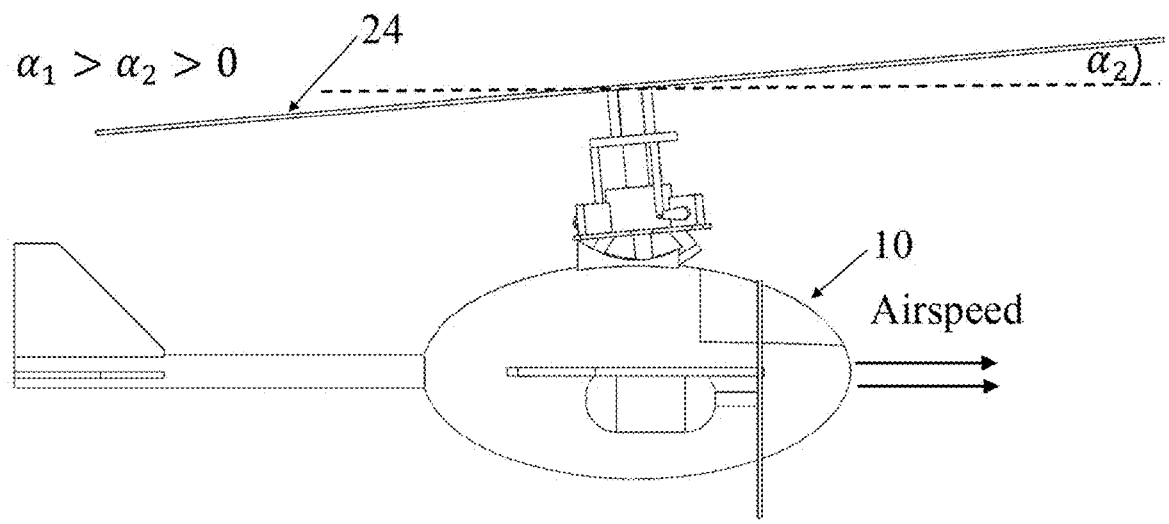
FIG. 2C is a side elevation view of the FIG. 1 fixed wing rotorcraft with a low positive rotor disc Angle of Attack (AOA) relative to airflow suitable for straight and level forward flight at medium airspeed on operation of its forward propulsion unit.
Figure 2D:
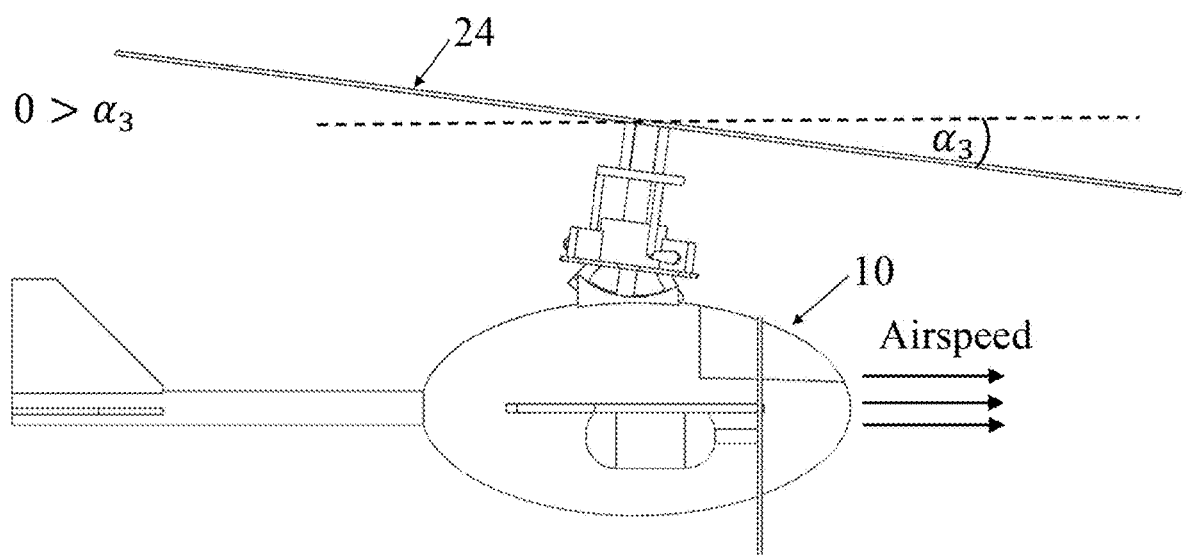
FIG. 2D is a side elevation view of the FIG. 1 fixed wing rotorcraft with a low negative rotor disc Angle of Attack (AOA) relative to airflow suitable for straight and level forward flight at high airspeed on operation of its forward propulsion unit.

FIG. 2A to FIG. 2D show the rotorcraft's rotor disc 24 having different angles of Attack relative to airflow during a flight trajectory from vertical takeoff via straight and level forward flight at high airspeed to vertical landing. Airflow is towards the fixed wing rotorcraft 10. The fuselage is substantially horizontal for aerodynamically efficient straight and level forward flight. FIG. 2A shows zero rotor disc Angle of Attack (AOA) relative to airflow suitable for vertical takeoff, vertical landing and hovering. FIG. 2B shows a high positive rotor disc Angle Of Attack (AOA) α1 relative to airflow suitable for low airspeed forward flight where α1>0°. FIG. 2C shows a low positive rotor disc Angle of Attack (AOA) α2>0° relative to airflow suitable for medium airspeed straight and level forward flight where α1>α2>0°. FIG. 2D shows a low negative rotor disc Angle of Attack (AOA) α3<0° relative to airflow suitable for high airspeed straight and level forward flight.

Figure 3A:
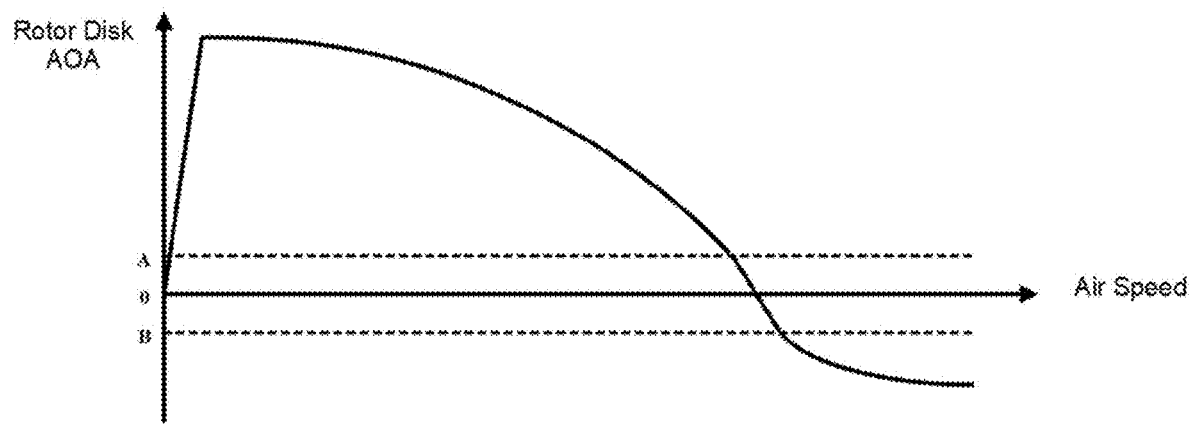
FIG. 3A is a graph of y-axis rotor disc Angle of Attack (AOA) relative to airflow against x-axis rotorcraft airspeed.
Figure 3B:
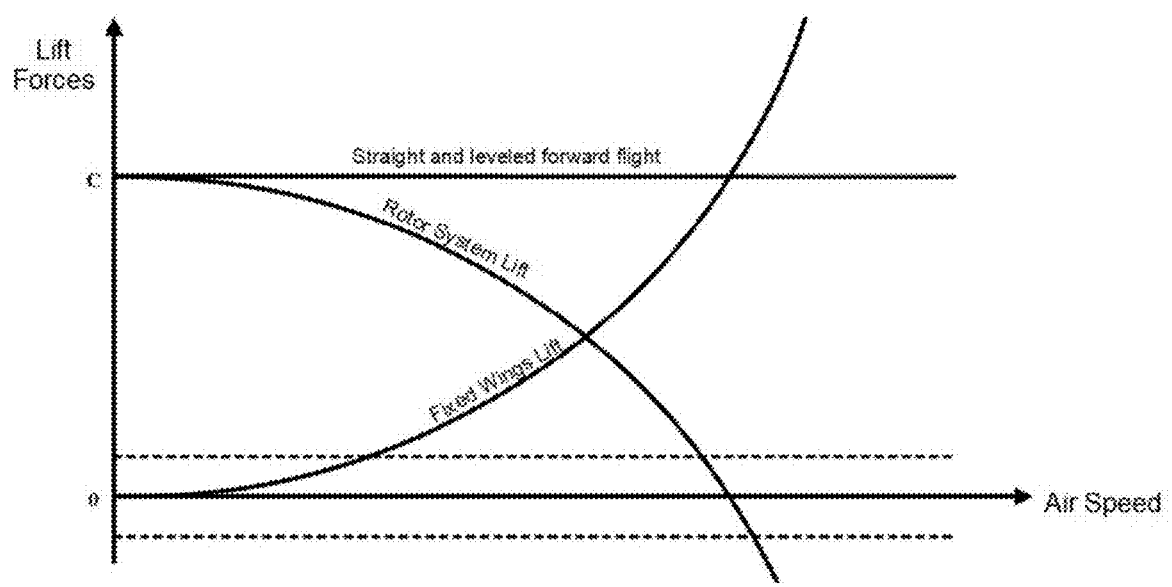
FIG. 3B is a graph of y-axis lift force against x-axis rotorcraft airspeed.

FIG. 3A and FIG. 3B show the fixed wing rotorcraft 10's operation envelope as a function of its airspeed as follows: The FIG. 3A graph includes a horizontal line A denoting a minimal positive rotor disc Angle of Attack (AOA) relative to airflow and a horizontal line B denoting a minimal negative rotor disc Angle of Attack (AOA) relative to airflow for autorotation and rotorcraft controllability. The FIG. 3B graph includes a horizontal line C denoting a maximum combined upward lift of fixed wing lift and rotor system lift for straight and level forward flight.

On vertical takeoff, the forward propulsion unit is not operated and the rotor disc has zero rotor disc Angle of Attack (AOA) relative to airflow. After vertical takeoff, the rotor disc is urged to a high rotor disc positive Angle of Attack (AOA) relative to airflow and the forward propulsion unit is operated for accelerating airspeed. As airspeed increases, the fixed wings afford exponentially greater upward lift which is offset by reducing the rotor disc Angle of Attack (AOA) relative to airflow, thereby reducing its upward lift. The rotor disc Angle of Attack (AOA) relative to airflow is controlled such that its upward lift force combined with the fixed wings' lift force remain at the required upward lift for straight and level forward flight. The rotorcraft reaches the previously considered maximum airspeed when its rotor disc Angle of Attack (AOA) is reduced to the minimal positive Angle of Attack (AOA) relative to airflow for enabling autorotation and rotorcraft controllability, namely, the intersection of the Rotor Disc AOA with the horizontal line A.

To increase airspeed to airspeeds faster than the previously considered maximum airspeed while maintaining controllability, requires a transition of the rotor disc Angle of Attack (AOA) from its minimal positive Angle of Attack (AOA) relative to airflow to its minimal negative Angle of Attack (AOA) relative to airflow namely, the intersection of the Rotor Disc AOA with the horizontal line B. Such transition at the same time provides a downward lift to counteract the fixed wings' continuously increasingly upward lift to maintain the combined upward lift at the required upward lift for straight and level forward flight.

Figure 4A:
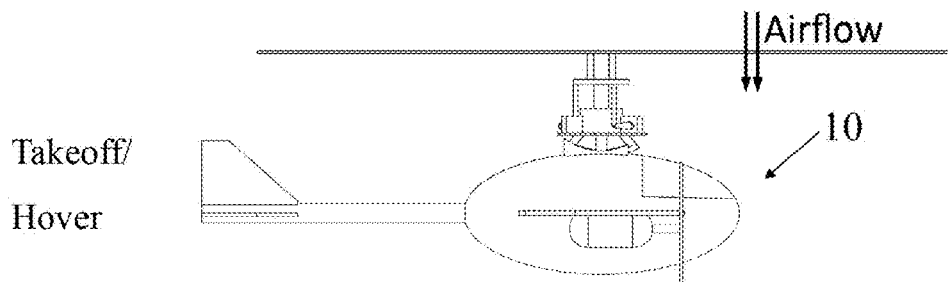
FIG. 4A to FIG. 4G show seven stages of a flight trajectory from vertical takeoff via straight and level forward flight at high airspeed to vertical landing.

FIG. 4A to FIG. 4G show a flight trajectory of a rotorcraft from vertical takeoff via high airspeed straight and level forward flight to vertical landing. The rotor disk 24 continuously rotates in the same either clockwise or counterclockwise direction from the flight trajectory's start to finish. The flight trajectory can be considered to include the following seven stages:

FIG. 4A shows vertical takeoff with zero rotor disc Angle of Attack (AOA) relative to airflow.

Figure 4B:
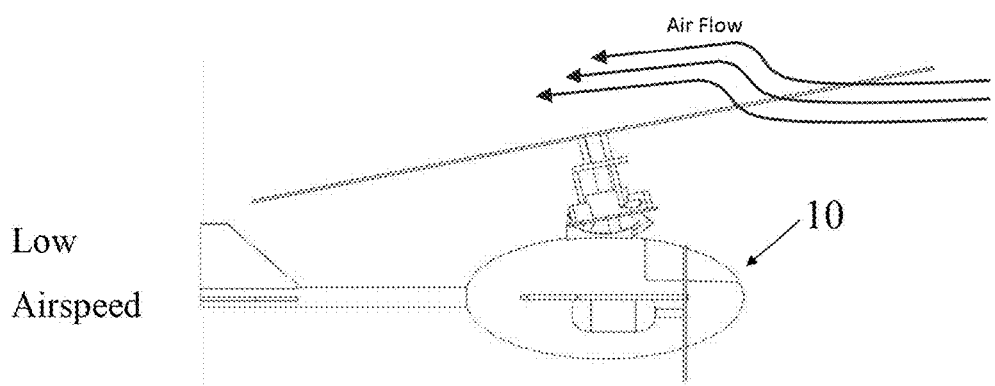

FIG. 4B shows accelerating forward flight at low airspeed with high positive rotor disc Angle of Attack (AOA) relative to airflow.

Figure 4C:
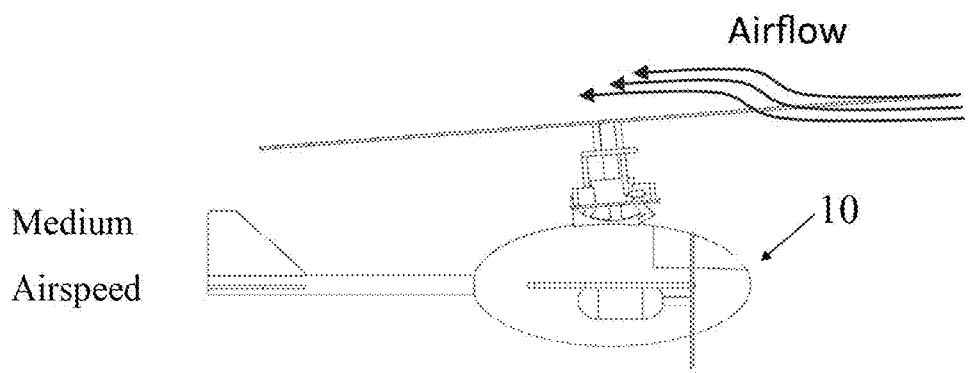

FIG. 4C shows straight and level forward flight at medium airspeed with low positive rotor disc Angle of Attack (AOA) relative to airflow.

Figure 4D:
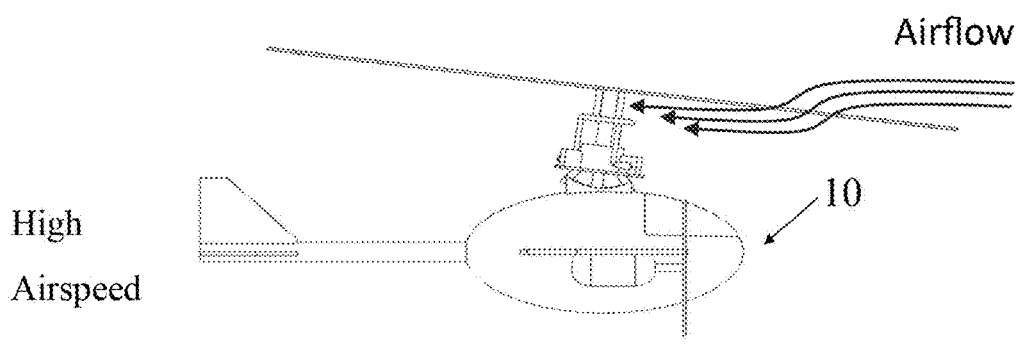

FIG. 4D shows straight and level forward flight at high airspeed with low negative rotor disc Angle of Attack (AOA) relative to airflow and change in collective rotor blade pitch relative to the FIG. 4C's collective rotor blade pitch.

Figure 4E:
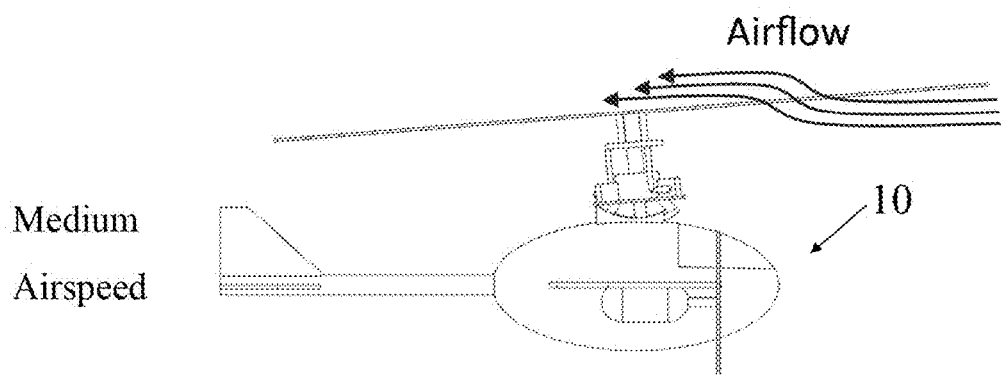

FIG. 4E shows straight and level forward flight at medium airspeed with low positive rotor disc Angle of Attack (AOA) relative to airflow requiring change in collective rotor blade pitch relative to the FIG. 4D's collective rotor blade pitch.

Figure 4F:
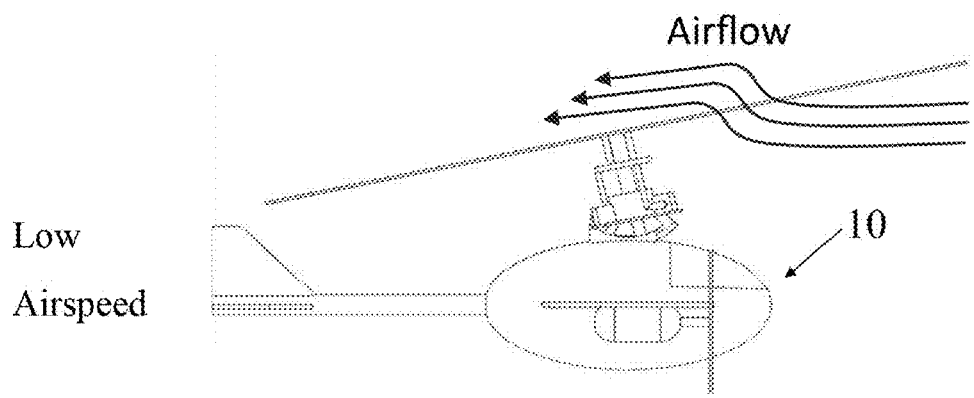

FIG. 4F shows decelerating forward flight at low airspeed with high positive rotor disc Angle of Attack (AOA) relative to airflow.

Figure 4G:
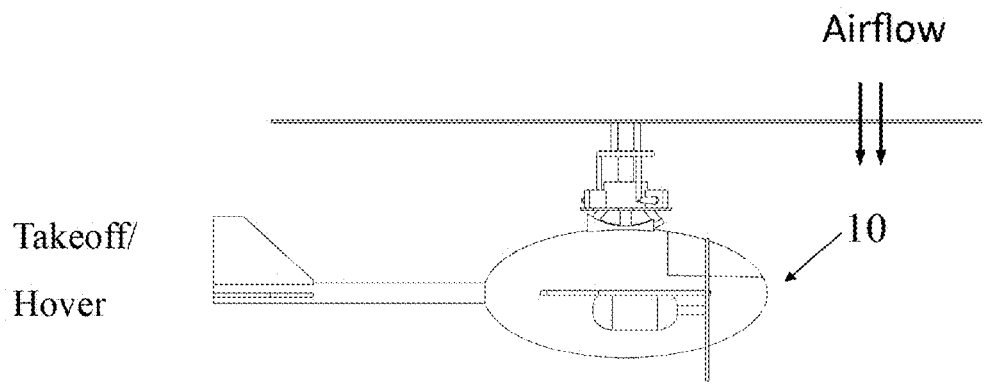

FIG. 4G shows vertical landing with zero rotor disc Angle of Attack (AOA) relative to airflow.

Figure 5A:
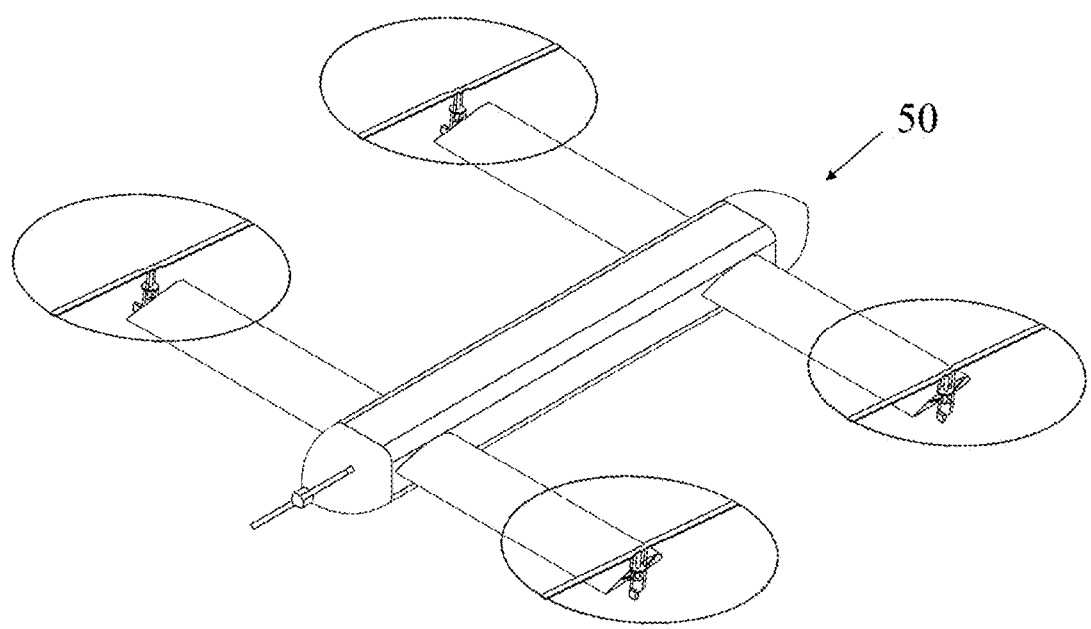
FIG. 5A is a pictorial view of a multi-rotor fixed wing rotorcraft designed for straight and level forward flight at high airspeed.
Figure 5B:
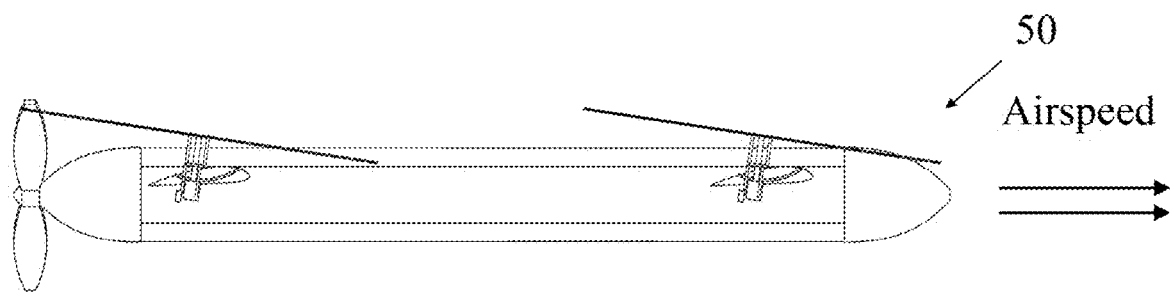
FIG. 5B is a side elevation view of the multi-rotor fixed wing rotorcraft flying at high speed.

FIG. 5A and FIG. 5B show a multi-rotor fixed wing rotorcraft 50 operable in a similar manner as the single rotor fixed wing rotorcraft 10.

While the invention has been described with respect to a limited number of embodiments, it will be appreciated that many variations, modifications, and other applications of the invention can be made within the scope of the appended claims.

The invention claimed is:

1. A fixed wing rotorcraft configured for forward flight, the fixed wing rotorcraft comprising:
a) a fuselage;
b) at least one pair of fixed wings;
c) a forward propulsion unit for providing forward thrust; and
d) at least one rotor system including:
a mast configured to have at least two rotor blades attached thereto,
a rotor drive unit for driving said mast whereupon said at least two rotor blades act as a rotor disc,
a controllable collective rotor blade pitch, and
a controllable cyclic rotor blade pitch,
wherein said mast being tiltable with respect to said fuselage in the direction of forward flight such that its associated rotor disc presents a variable Angle of Attack (AOA) with respect to airflow,
wherein, during the fixed wing rotorcraft's straight and level forward flight,
said fuselage being substantially horizontal,
at a first airspeed, said mast being tilted backwards such that its rotor disc autorotates at a positive rotor disc Angle of Attack (AOA) relative to airflow and said at least two rotor blades being set at a first collective rotor blade pitch, and
at a second airspeed faster than said first airspeed, said mast being tilted forward such that its rotor disc autorotates at a negative rotor disc Angle of Attack (AOA) relative to airflow,
and said at least two rotor blades being set at a second collective rotor blade pitch different from said first collective rotor blade pitch and configured to maintain said rotor disc's spin direction at said first airspeed.

2. The rotorcraft according to claim 1 wherein during transition between said positive rotor disc Angle of Attack (AOA) relative to airflow at said first airspeed and said negative rotor disc Angle of Attack (AOA) relative to airflow at said second airspeed, said collective rotor blade pitch is controlled to approximately maintain said rotor disc's rotational speed.

3. The rotorcraft according to claim 1 and further comprising a mechanical arrangement for tilting said tiltable mast.

4. The rotorcraft according to claim 1 wherein said rotor system autorotates unpowered.

5. The rotorcraft according to claim 1 wherein said rotor system autorotates partially powered.

6. The rotorcraft according to claim 1 and further comprising a Flight Control System for controlling the fixed wing rotorcraft.

7. A flight control system configured to control the fixed wing rotorcraft according to claim 1, wherein controlling the fixed wing rotorcraft during straight and level forward flight includes,
maintaining the fuselage being substantially horizontal,
at the first airspeed, tilting the mast backwards such that its rotor disc autorotates at the positive rotor disc Angle of Attack (AOA) relative to airflow and setting the at least two rotor blades at the first collective rotor blade pitch, and
at the second airspeed faster than the first airspeed, tilting the mast forward such that its rotor disc autorotates at the negative rotor disc Angle of Attack (AOA) relative to airflow, and
setting the at least two rotor blades at the second collective rotor blade pitch different from the first collective rotor blade pitch and configured to maintain the rotor disc's spin direction at the first airspeed.

8. The flight control system according to claim 7 wherein during transition between the positive rotor disc Angle of Attack (AOA) relative to airflow at the first airspeed and the negative rotor disc Angle of Attack (AOA) relative to airflow at the second airspeed, the collective rotor blade pitch is controlled to approximately maintain the rotor disc's rotational speed.

9. A computer readable storage medium comprising instructions which cause the flight control system to control the fixed wing rotorcraft according to claim 8 when executed by a flight control system in the fixed wing rotorcraft.

10. The computer readable storage medium according to claim 9 wherein during transition between the positive rotor disc Angle of Attack (AOA) relative to airflow at the first airspeed and the negative rotor disc Angle of Attack (AOA)

relative to airflow at the second airspeed, the collective rotor blade pitch is controlled to approximately maintain the rotor disc's rotational speed.

11. A method operating a fixed wing rotorcraft comprising the steps of:
a) providing a rotorcraft having
a fuselage;
at least one pair of fixed wings;
a forward propulsion unit for providing forward thrust; and
at least one rotor system including:
a mast configured to have at least two rotor blades attached thereto,
a rotor drive unit for driving said mast whereupon said at least two rotor blades act as a rotor disc,
a controllable collective rotor blade pitch, and
a controllable cyclic rotor blade pitch,
wherein the mast being tiltable with respect to the fuselage in the direction of forward flight such that its associated rotor disc presents a variable Angle of Attack (AOA) with respect to airflow, and
b) controlling the fixed wing rotorcraft during straight and level forward flight such that the fuselage is substantially horizontal, at a first airspeed, the mast is tilted backwards such that its rotor disc autorotates at a positive rotor disc Angle of Attack (AOA) relative to airflow and the at least two rotor blades are set at a first collective rotor blade pitch, and at a second airspeed faster than the first airspeed, the mast is tilted forward such that its rotor disc autorotates at a negative rotor disc Angle of Attack (AOA) relative to airflow, and the at least two rotor blades are set at a second collective rotor blade pitch different from the first collective rotor blade pitch and configured to maintain the rotor disc's spin direction at the first airspeed.

12. The method according to claim 11 wherein during transition between the positive rotor disc Angle of Attack (AOA) relative to airflow at the first airspeed and the negative rotor disc Angle of Attack (AOA) relative to airflow at the second airspeed, the collective rotor blade pitch is controlled to approximately maintain the rotor disc's rotational speed.

* * * * *